(12) United States Patent
Förster et al.

(10) Patent No.: US 12,508,878 B2
(45) Date of Patent: Dec. 30, 2025

(54) HEAT EXCHANGER WITH OPTIMIZED TEMPERATURE PROFILE

(71) Applicant: MAHLE INTERNATIONAL GMBH, Stuttgart (DE)

(72) Inventors: Uwe Förster, Erdmannhausen (DE); Martin Sievers, Kernen im Remstal (DE); Nikolaj Bittner, Esslingen am Neckar (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 149 days.

(21) Appl. No.: 18/410,375

(22) Filed: Jan. 11, 2024

(65) Prior Publication Data
US 2024/0239156 A1   Jul. 18, 2024

(30) Foreign Application Priority Data
Jan. 13, 2023   (DE) .......................... 102023100727.0

(51) Int. Cl.
*B60H 1/32*   (2006.01)
*B60H 1/22*   (2006.01)

(52) U.S. Cl.
CPC .......... *B60H 1/3227* (2013.01); *B60H 1/2225* (2013.01)

(58) Field of Classification Search
CPC ................ B60H 1/3227; B60H 1/2225; B60H 1/00328; F25B 39/04; F28D 1/05375; F28D 9/0221; F28D 9/0246; F28D 9/262; F28D 2021/0084
See application file for complete search history.

(56) References Cited

U.S. PATENT DOCUMENTS

| 7,607,473 B2 | 10/2009 | Ichiyanagi |
| 9,683,764 B2 | 6/2017 | Moreau et al. |
| 2008/0110604 A1 * | 5/2008 | Janssen ............... F28D 1/05391 165/151 |

FOREIGN PATENT DOCUMENTS

| CN | 105683701 A * | 6/2016 | ............. F28F 1/025 |
| DE | 102005015799 A1 * | 5/2006 | ............. F28F 9/0278 |
| DE | 112005000797 | 3/2007 | |
| DE | 102007007233 A1 * | 9/2008 | ......... B60H 1/00335 |
| DE | 102013106831 | 12/2014 | |
| FR | 2994256 A1 * | 2/2014 | ........... B60H 1/3227 |
| KR | 102324879 | 11/2021 | |
| WO | WO-2020244555 A1 * | 12/2020 | ................ F28F 9/02 |

* cited by examiner

*Primary Examiner* — Emmanuel E Duke
(74) *Attorney, Agent, or Firm* — Barnes & Thornburg LLP (57) ABSTRACT

The invention relates to a heat exchanger, preferably a condenser, in particular for a motor vehicle, exhibiting: height, width, length, and tubes through which a first medium flows. A second medium flows around the tubes. The heat exchanger contains at least three rows across its width of tubes along its length. Each of the tubes are combined in the at least three rows to form at least one flow path for the first medium. The first row has at least one flow path through which the first medium flows vertically. The first flow path preferably comprises at least one third of the length of the heat exchanger, such that the temperature profile of the heat exchanger is improved. This is obtained in that the occurrence of disparities in the temperature profile is significantly reduced or even prevented.

15 Claims, 6 Drawing Sheets

| Maximum Measured Temperature Differences | | |
|---|---|---|
| | Heat Exchanger from the Prior Art | First Embodiment of the Heat Exchanger According to the Invention |
| | °K | °K |
| Global Temperature Difference | 29°K | 8°K |
| Vertical Temperature Difference | 27°K | 0°K |
| Lateral Temperature Difference | -8°K | 0°K |

Fig. 6

HEAT EXCHANGER WITH OPTIMIZED TEMPERATURE PROFILE

CROSS-REFERENCE TO RELATED APPLICATIONS

This application claims priority from German Patent Application No. DE 10 2023 100 727.0, filed Jan. 13, 2023, the entirety of which is hereby fully incorporated by reference herein.

The invention relates to a heat exchanger with an optimized temperature profile and use of the heat exchanger in an air conditioning system for a motor vehicle.

A motor vehicle air conditioning system is described in DE 1020 100 430 00 A1 that has a heat exchanger for heating the air supplied to the vehicle interior. The motor vehicle can have an electric drive. This heat exchanger is part of a cooling cycle in the heat pump mode, in which the heat exchanger comprises tubes (cooling tubes) for conveying a medium (coolant) and two collectors (collector tubes) with which the tubes are connected to one another. The heat exchanger therein is a coolant condenser with tubes in a single row. The tubes are basically parallel to one another. The tubes are flat tubes, with corrugated ribs between them. The tubes are adjacent to one another in a row. Because there is only one row of tubes in this heat exchanger, it has a limited capacity, determined by the restrictions of the installation space. In motor vehicles with an electric drive, there is normally very little available installation space. A significantly more effective heat exchanger cannot be obtained with the heat exchanger described therein because a more effective heat exchanger with tubes in just a single row would require a lot of space. Because it is not possible to increase the capacity of the heat exchanger described therein, additional electric heaters would be necessary for heating the air supplied to the vehicle interior. The use of electric heaters in an electric vehicle can significantly reduce the range of the vehicle. The heat exchanger described therein displays large disparities in its temperature profile. To keep the passengers in a vehicle comfortable, it is important to maintain a nearly uniform temperature profile. The heat exchanger can be operated using carbon dioxide as the coolant. When carbon dioxide is used, it may be very warm when entering the heat exchanger. This can also contribute to the disparities in the temperature profile, further compromising the comfort of the passengers.

The device obtained with the invention, which has the features in the independent claims, has the advantage that the heat exchanger has a high capacity with a uniform temperature profile.

The heat exchanger can be used in a motor vehicle. The motor vehicle can be a motor vehicle that is powered entirely or primarily with electricity. The heat exchanger can exhibit a width, length, height, and tubes through which a first medium is conveyed. The heat exchanger can have a rectangular design. The heat exchanger can contain two collectors. The first medium can be distributed to the tubes from the collectors, or returned thereto. These collectors can be at opposite ends of the tubes. The collector at the lower ends of the tubes can be regarded as the lower collector. The collector at the upper ends of the tubes can be regarded as the upper collector. The first medium can be conveyed to the heat exchanger through a feed line and removed therefrom through an outlet line. In a first embodiment of the heat exchanger according to the invention, the feed line can be at the lower collector and the outlet line can be at the upper collector. The vertical direction can run along the tubes from the lower collector to the upper collector. In a second design of the heat exchanger according to the invention, both the feed line and the outlet line can be at the lower collector. The vertical direction can run along the tubes from the lower collector to the upper collector. In a third design of the heat exchanger according to the invention, the feed line and the outlet line can be at the upper collector. In this case, the vertical direction can run along the tubes from the upper collector to the lower collector. In another design of the heat exchanger according to the invention, the feed line can be at the upper collector and the outlet line can be at the lower collector. The vertical direction can run along the tubes from the upper collector to the lower collector in this case as well. The width of the heat exchanger is defined by the shortest side of the heat exchanger. In this case, the length of the heat exchanger is defined in the direction transverse to the tubes. The heat exchanger can contain at least three adjacent rows of tubes along its length. These tubes in the at least three rows can be combined to form at least one flow path for the first medium. The first row can contain at least one flow path through which the first medium flows vertically. This first flow path can comprise at least one third of the length of the heat exchanger. The heat exchanger can contain three rows in a first embodiment according to the invention. This results in a heat exchanger with a high capacity. The first flow path preferably comprises one third of the length of the heat exchanger. The heat exchanger can be designed such that the first medium initially flows through the first section in the first row. A second medium can flow around the tubes in the heat exchanger, such that heat is exchanged between the first and second medium. By way of example, the first medium may be very hot and the second medium can be cold. Because the first flow path can comprise at least one third the length of the heat exchanger, and the hot first medium can first flow through it, the first medium can be significantly cooled when flowing through the first section. The potential for disparities in the temperature profile in downstream laterally adjacent rows can be reduced enough that the maximum difference in temperatures can already be strongly reduced. By cooling one third of the length of the first row, a clearly more uniform temperature profile can be obtained over the length of the heat exchanger. The disparities in the global temperature profile for the heat exchanger can be significantly reduced. This results in an overall improvement in the comfort of the vehicle occupants. A temperature profile describes the temperature fluctuations in space. With a uniform temperature profile, the temperature remains constant. A single flow path can be formed by numerous tubes in the heat exchanger. The global temperature profile comprises the combined temperature profiles along the length, width and height of the heat exchanger.

In another embodiment of the heat exchanger according to the invention, the heat exchanger can have a first flow path that comprises the entire length of the heat exchanger. The first flow path can comprise the first row in the heat exchanger. By way of example, the first medium may be very hot. Because the first flow path comprises the length of the heat exchanger, the medium can be cooled to a greater extent. The potential for disparities in the temperature profile in the adjacent downstream rows can be further reduced in this manner. Because the first flow path can comprise the length of the heat exchanger, a more uniform temperature profile can be obtained over the length of the heat exchanger. This results in a heat exchanger with a more uniform global temperature profile, thus further increasing the comfort of the vehicle occupants.

The heat exchanger can comprise at least two more rows of tubes. The at least two more rows can be laterally downstream of the first row, and comprise at least two flow paths over the length thereof. The first medium can flow vertically through the at least two additional flow paths, in the same or opposing direction. The first medium can flow in the at least two flow paths such that in the row downstream of the second row, it flows in the direction opposite of that in the upstream flow path. By dividing the at least two rows downstream of the first row in the heat exchanger, the flow speed of the first medium can be increased, thus also advantageously increasing the capacity of the heat exchanger. The first medium can flow vertically through at least one third of the length of the heat exchanger in the first row. This already substantially cools the first medium. The negative impact of dividing the flow in the at least two rows downstream of the first row into at least two flow paths on the global temperature profile can be reduced in this manner. This increases the capacity of the heat exchanger and therefore reduces or even eliminates the associated negative impact to the global temperature profile of the heat exchanger. The flow speed is understood to be the average speed of a directional movement of a medium in a volume (in this case the tubes).

In another embodiment according to the invention, the heat exchanger can contain five flow paths. These five flow paths can be in three rows. The first row can form the first flow path. The first medium can flow vertically through the first flow path. The second row can contain two flow paths, thus forming the second and third flow paths. The third row can contain two flow paths that form the fourth and fifth flow paths. The first medium can then flow through the second flow path in the second row in the direction opposite that of the first flow path, and through the third flow path in the same direction as the first flow path. The first medium flows through the fourth flow path in the same direction as the first flow path, and through the fifth flow path in the opposite direction. The flow speed of the first medium, and therefore the capacity of the heat exchanger, can be increased through the division of the second and third rows into two flow paths. Negative impacts on the global temperature profile can be prevented by the first medium flowing through the first flow path. This advantageously results in a heat exchanger with a greater capacity and a uniform global temperature profile.

In another embodiment of the heat exchanger according to the invention, the second flow path can be between one third and two thirds the length of the heat exchanger. The third flow path can occupy the rest of the heat exchanger over its length. In this case, the heat exchanger can contain three rows. The first flow path can be in the first row. The second and third flow paths can be in the second row. The fourth flow path can be between one third and two thirds the length of the heat exchanger. The fifth flow path can occupy the rest of the heat exchanger over its length. The fourth and fifth flow paths can be in the third row.

In another embodiment of the heat exchanger according to the invention, the two flow paths in the second row can each occupy half of the length of the heat exchanger. In this case, each of the two flow paths in the third row also occupy half the length of the heat exchanger. This heat exchanger can comprise three rows. The first flow path can be in the first row. The first medium can flow vertically through the first flow path. The second and third flow paths can be in the second row. The direction in which the first medium flows through the second flow path can be opposite that of the first flow path, and the direction of the third flow path can be the same as that of the first. The fourth and fifth flow paths can be in the third row. The first medium can flow through the fourth flow path in the opposite direction of the first flow path, and the first medium can flow through the fifth flow path in the same direction as the first flow path. In this case, the first medium flows through the fourth flow path in the direction opposite that in the upstream flow path, in this case the third flow path. This results in a heat exchanger with a high capacity and a uniform global temperature profile.

In another embodiment according to the invention, the heat exchanger can have five flow paths and three rows. The five flow paths can be interconnected in the rows. This results in a more uniform temperature profile for the heat exchanger.

In another embodiment according to the invention, the heat exchanger can contain three rows and five flow paths. The four flow paths in the second and third rows can each be divided into at least two sections, which can alternate over the width. The first flow path can be in the first row, and the first medium can flow upward through it. The second and third flow paths can be in the second row. The first medium can flow through the second flow path in the opposite direction as the first flow path, and through the third flow path in the same direction as the first. The second and third flow paths can each be divided into two sections. The first section of the second flow path can be followed by the first section of the third flow path along the length of the heat exchanger. The first section of the third flow path can be followed by the second section of the second flow path along the length. The first section of the fourth flow path in the third row can be placed such that the direction in which the first medium flows through it is opposite the direction in which the first medium flows through the upstream section in the lateral direction. The fourth and fifth flow paths can each be divided into two sections. The first section of the fifth flow path can be downstream of the first section of the fourth flow path along the length of the heat exchanger in the direction opposite to that of the second row. The second section of the fourth flow path and the second section of the fifth flow path can then be placed downstream thereof. Disparities in the temperature profile in the lateral direction can be further reduced through the division of the second through fifth fourth flow paths into numerous sections, thus resulting in a more uniform temperature profile for the heat exchanger. The disparities in the temperature profile for two larger flow paths, as is the case here, form ripples with a lower number of tubes in each section. These ripples advantageously cancel each other out more quickly behind the heat exchanger.

In another embodiment according to the invention, the heat exchanger can contain three rows and five flow paths. The first flow path can occupy the first row. The second and third flow paths can be in the second row, and the fourth and fifth flow paths can be in the third row. In this case, the first medium flows vertically in a first direction through the first, third, and fifth flow path. The first medium then flows vertically in the opposite direction through the second and fourth flow paths. The second flow path in the second row can be divided into four sections, and the third flow path can be divided into three sections. These sections of the second and third flow paths can alternate. The ends of the second row can be formed by two sections of the second flow path. The fifth flow path in the third row can be divided into five four sections. The ends of the third row can be formed by two sections of the fifth flow path. The fourth flow path in the third row can be divided into three sections. The sections of the fourth and fifth flow paths can alternate. With this configuration of the sections, the first medium can flow through a section in the third row in the opposite direction that it flows through an adjacent section in the second row. By dividing the second through fourth fifth flow paths into numerous sections, disparities in the temperature profile in the lateral direction can be further reduced, thus resulting in a heat exchanger with a greater capacity and a more uniform global temperature profile.

The tubes in the heat exchanger according to the invention can be flat tubes. The first medium can flow through the tubes while a second medium flows over the tubes. The tubes can be substantially parallel to one another. The tubes can run vertically or horizontally. Corrugated ribs can be placed between the tubes. This increases the surface area available for heat exchange between the two mediums.

The heat exchanger can have two collectors with which the tubes are connected to one another for conducting fluid. The two collectors can be on opposite ends of the tubes.

The first medium can be collected in or distributed to at least one channel in the two collectors. The two collectors can each conceivably contain three channels for collecting or distributing the first medium. The two collectors could also have two chambers in which the first medium is collected or distributed.

In the first embodiment according to the invention, the heat exchanger can have at least two first distributor plates for distributing the first medium to the flow paths. The at least two second distributor plates can be placed between the collectors and the opposing ends of the tubes. The heat exchanger can be divided into the five flow paths by the two first distributor plates. The first medium can thus be distributed to the five flow paths and then collected again. The heat exchanger can have at least two second distributor plates for distributing the first medium to the tubes. The at least two second distributor plates can be placed between the at least two first distributor plates and the opposite ends of the tubes. A single flow path can contain one or more tubes. A flow path can be divided by the two second distributor plates in the tubes containing the flow path. The first medium can be distributed to the tubes by the two second distributor plates and then collected again.

The first medium can be deflected laterally in the two collectors by the at least two first distributor plates. As a result, the first medium can flow either up or down through the flow paths. The heat exchanger can contain two collectors and two first distributor plates in the second embodiment according to the invention, which are on opposite ends of the tubes. The entire first row can form the first flow path. The second row can contain the second and third flow paths, and the third row can contain the fourth and fifth flow paths. The first medium can flow vertically upward through the first flow path. The first medium can then be deflected laterally in the upper collector by the first distributor plate. This conveys the first medium vertically downward through the second flow path and fourth flow path.

In a first variation, the tubes, corrugated ribs, at least two first distributer plates, at least two second distributor plates, and two collectors in the heat exchanger can be made of metal. These tubes, corrugated ribs, at least two first distributor plates, at least two second distributor plates, and two collectors could be made of an aluminum alloy. The tubes, corrugated ribs, at least two first distributer plates, at least two second distributor plates, and the two collectors can be materially bonded to one another. This material bonding can be obtained by with a brazing process. In another variation, the two collectors can be made of plastic instead of metal. In this case, the two collectors can be connected to the other components in a force and/or form-fitting manner.

The air conditioning system for a motor vehicle according to the invention can comprise a housing, a heat pump, at least one channel for a second medium, at least one blower, and a heat exchanger according to the invention that is part of a cooling circuit for heating the second medium that is conveyed to the vehicle interior. The heat exchanger can be a condenser. There is no, or very little, heat loss when driving a motor vehicle that is powered entirely or primarily with electricity that could be used for heating the vehicle interior. The electricity needed to power the motor vehicle can be supplied by batteries. If electric heaters are used for heating the vehicle interior, a great deal of electricity is needed from the batteries. This can severely limit the travel range of the vehicle. For this reason, the cooling circuit in the air conditioning system according to the invention can be used not only for cooling the second medium, but also for heating the second medium in the heat pump mode. Heat can be taken from the air around the motor vehicle with a vaporizer, and used to heat the second medium with the heat exchanger according to the invention. In this case, the heat exchanger is used as a condenser. The second medium can be air. The cooling circuit can be composed of the vaporizer, an expansion mechanism, a heat exchanger according to the invention that acts as a condenser, and a connecting line. The first medium can act as a coolant flowing through the cooling circuit. Carbon dioxide (R744) can be used for the first medium. The coolants R1234yf, R1234a, or R290 can also be used.

In another exemplary embodiment, the air conditioning system can also contain an electric resistance-heating unit for heating the second medium. This converts electricity to heat. The electric resistance-heating unit can be a PTC heater. A PTC heater is an electric component with a temperature-dependent resistor and can be made of a ceramic material. Its positive temperature coefficient allows a current to flow more easily at higher temperatures than at low temperatures. The electric resistance heating unit can also be obtained with a thermal resistor. The thermal resistor is basically an electric resistor that has a substantially constant temperature coefficient over a broad temperature range. The electric resistor can be made of metal, and its nearly constant temperature coefficient allows the current to flow the same at high temperatures as at low temperatures. The temperature coefficient of the electric resistor defines the change in resistance in a conductor as a function of the change in temperature.

In another embodiment according to the invention, the heat exchanger can have a length, width and height. This heat exchanger can have tubes for a first medium. The heat exchanger can have two adjacent rows of tubes running through its length. The tubes can be configured such that the first medium flows vertically in one direction in a tube in the first row, and in the other direction in the adjacent tube in the second row. This heat exchanger can have four flow paths. Each flow path can contain one or more tubes. The first and second flow paths can be in the first row. After the first medium flows through the second flow path, it can be deflected laterally. The third and fourth flow paths can be in the second row. The tubes in the two rows can be configured such that the direction that the first medium flows through a tube in the second row is opposite the direction that the first medium flows through the adjacent tube in the first row. This results in a heat exchanger with a high capacity that requires very little installation space. The heat exchanger can advantageously have a uniform temperature profile, thus increasing the comfort level for the vehicle occupants.

In another embodiment according to the invention, the heat exchanger can contain two adjacent rows of tubes running through its length. The tubes can be configured in the two rows such that the first medium flows in one direction through alternating pairs of tubes in one row, and then in the other direction through the alternating pairs of tubes in the other row. This heat exchanger also has four flow paths. The first and second flow paths can be in the first row. The third and fourth flow paths can be in the second row. Each flow path can contain one or more tubes. The tubes can be configured in the two rows such that the first medium can flow in one direction through a tube in the second row that is opposite the direction it flows through the adjacent tube in the first row. This results in a heat exchanger with a high capacity that requires very little installation space. The heat exchanger can advantageously have a uniform temperature profile, thus increasing the comfort level for the vehicle occupants.

In another embodiment according to the invention, the heat exchanger can have two adjacent rows of tubes running through its length. These tubes can be configured such that the first medium flows through two adjacent tubes in the first row in one direction, and then through an adjacent tube in the second row in the other direction. This heat exchanger can have six flow paths. Each flow path can contain one or more tubes. The first, second, and third flow paths can be in the first row. The fourth, fifth and sixth flow paths can be in the second row. The tubes can be configured in the two rows such that the first medium flows in one direction through a tube in the first row, and in the other direction through the adjacent tube in the second row. This results in a heat exchanger with a high capacity that requires very little installation space. The heat exchanger can advantageously have a uniform temperature profile, thus increasing the comfort level for the vehicle occupants.

Figure 1:
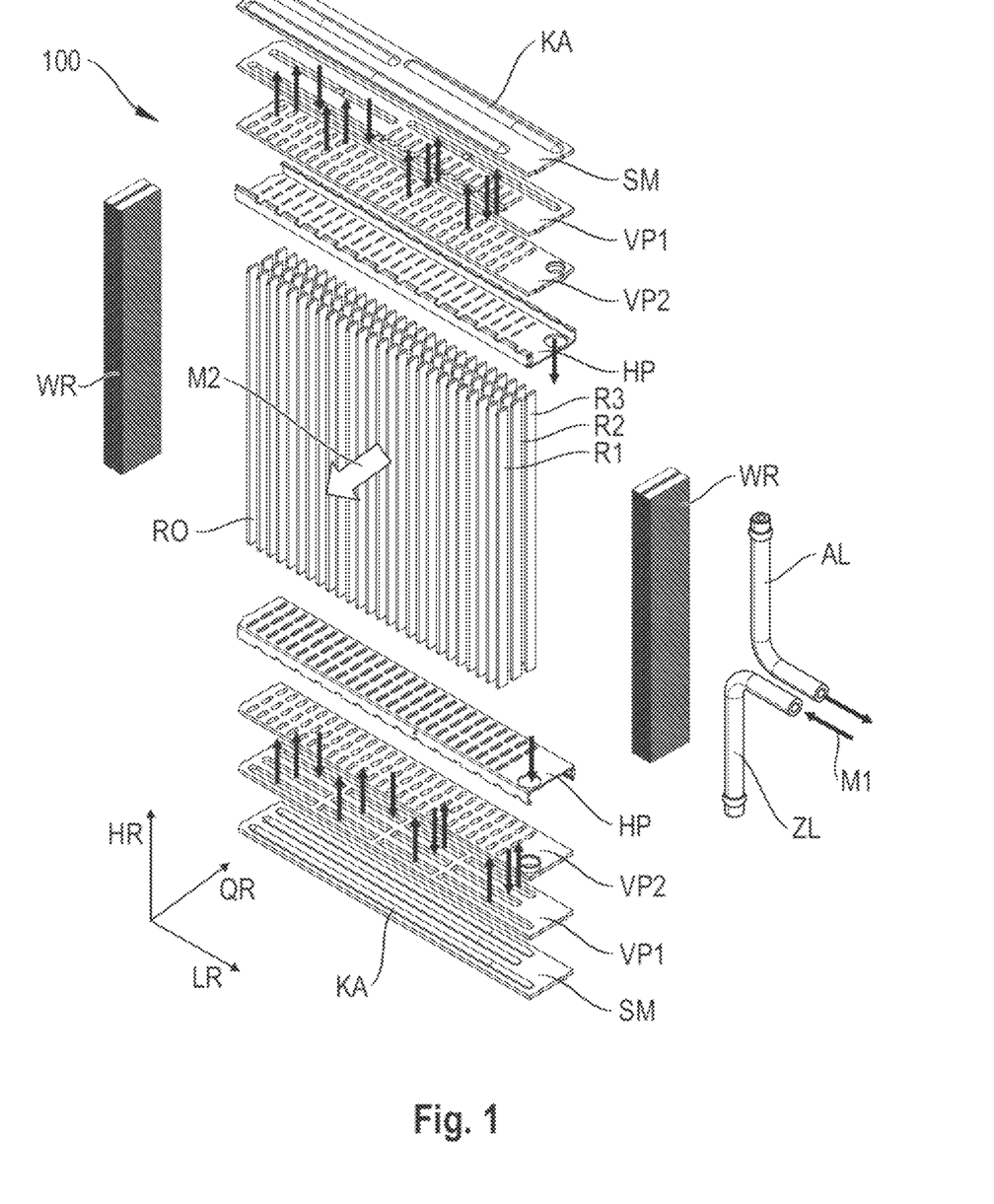
FIG. 1 shows an exploded view of the heat exchanger in a first embodiment according to the invention.

The heat exchanger 100 in the first figure is shown in an exploded illustration of a first embodiment according to the invention. The heat exchanger contains tubes RO through which the first medium M1 flows. The second medium M2 flows around the tubes. The first medium M1 can be a coolant, and the second medium can be air. There are corrugated ribs WR between the tubes RO that increase the surface area available for the heat exchange between the first medium M1 and the second medium M2. The first medium M1 flows either up or down vertically HR through the tubes in the heat exchanger 100. The length LR is defined by the longer side of the heat exchanger 100. The width QR is defined by the shorter side of the heat exchanger 100. The first medium M1 flows into the heat exchanger 100 at the bottom through the feed line ZL, and out of the heat exchanger 100 at the top through the outlet line AL. In this case, the vertical direction HR is from the lower collector SM to the upper collector SM, because the feel line ZL is at the bottom, and the outlet line is at the top. The tubes RO are in three adjacent rows R1, R2, R3 along the length LR. The three rows R1, R2, R3 are adjacent to one another across the width. The first medium M1 flows upward through the tubes RO in the first row R1, forming a first flow path. The first medium M1 then flows upward and downward through tubes RO in the second row R2 and third row R3 in the vertical direction HR. The tubes RO in the second row and third row R3 are connected such that four more flow paths are created. The first medium is connected or distributed in the two collectors SM. The first medium M1 is distributed to or collected from the five flow paths by the two first distributer plates VP1 and the channels KA in the collectors SM. It is also conceivable that instead of channels KA, the two collectors have chambers for distributing or collecting the first medium M1. The first medium M1 is distributed to the tubes RO or collected therefrom by the two second distributer plates VP2. The tubes RO are connected to the other parts of the heat exchanger 100 with two retaining plates HP. The two retaining plates HP have eyelets or holes through which the tubes RO are inserted during assembly. It is conceivable that all of the parts of the heat exchanger 100 are made of metal and materially bonded to one another. It is also conceivable that the two collectors SM and the two second distributer plates VP1 can be made of plastic, and connected to the other parts of the heat exchanger 100 with a force-fitting connection.

Figure 2A:
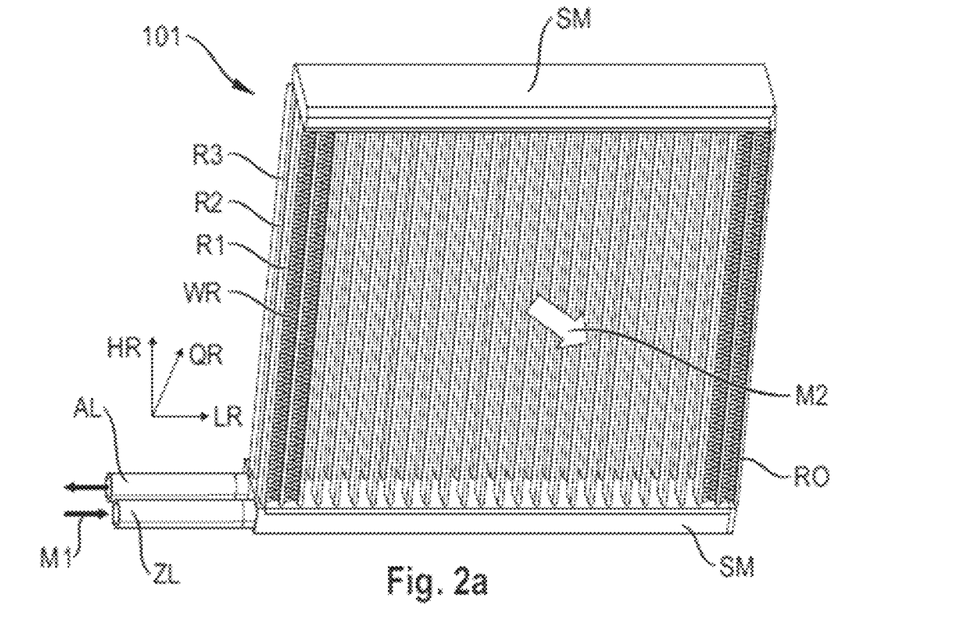
FIG. 2a shows the heat exchanger according to the invention with the feed and outlet at the bottom.
Figure 2B:
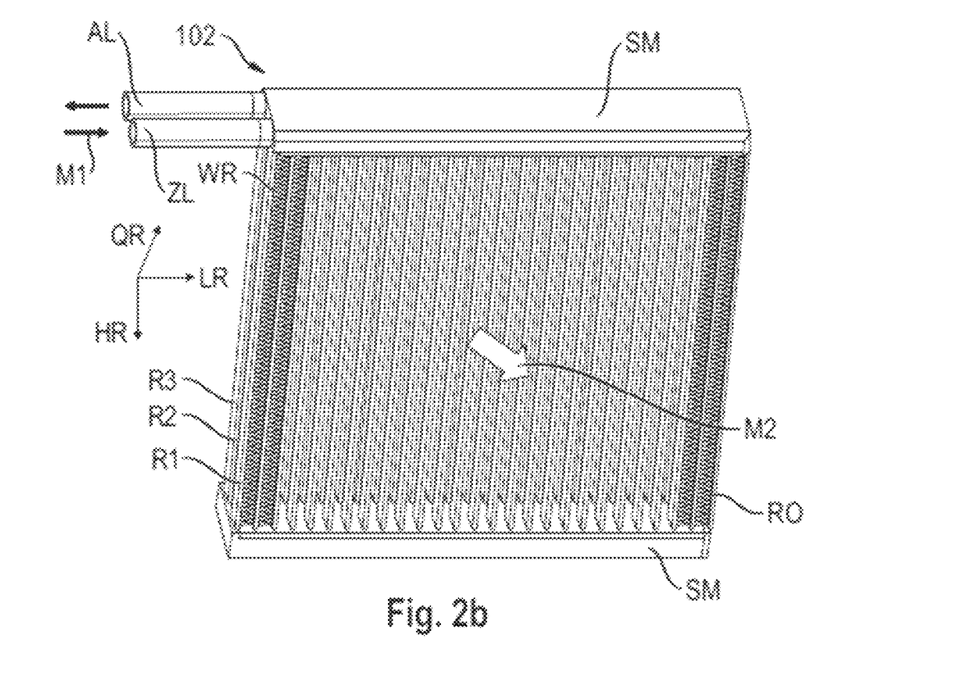
FIG. 2b shows the heat exchanger according to the invention with the feed and outlet at the top.

FIGS. 2a and 2b show a second embodiment and third embodiment of an assembled heat exchanger.

The heat exchanger 100 contains tubes RO through which a first medium M1 flows. The second medium M2 flows around the tubes RO. The first medium M1 can be a coolant, and the second medium M2 can be air. There are corrugated ribs WR between the tubes RO, which increase the surface area available for heat exchange between the first medium M1 and the second medium M2. There are two collectors SM, which are located on opposite ends of the tubes RO. The first medium M1 is distributed to and collected from the tubes in the two collectors. The lower collector SM is on the bottom ends of the tubes RO. The upper collector is on the upper ends of the tubes RO. The length LR is defined by the longer side of the heat exchanger 100. The width QR is defined by the shorter side of the heat exchanger 100. The tubes RO are in three rows R1, R2, R3 along the length LR of the heat exchanger 100. The three rows R1, R2, R3 are adjacent to one another along the width.

In a second embodiment of the heat exchanger 101 according to the invention shown in FIG. 2a, the feed line ZL and outlet line AL for the first medium M1 are connected to the lower collector SM. The vertical direction runs from the lower collector SM, which has the feed line ZL and outlet line AL, to the upper collector SM. The first medium M1 flows upward through the tubes RO in the first row R1, thus forming a first flow path. The first medium M1 flows upward and downward in the vertical direction HR in the tubes RO in the second row R2 and third row R3. This results in four more flow paths through the tubes in the second row and third row R3.

In a third embodiment of the heat exchanger 102 according to the invention shown in FIG. 2b, the feed line ZL and outlet line AL for the first medium M1 are connected to the upper collector SM. In this case, the vertical direction HR runs downward from the upper collector SM, which has the feed line ZL and outlet line AL, to the lower collector SM. The first medium M1 flows downward in the vertical direction HR though the tubes RO in the first row R1, thus forming a first flow path. The first medium M1 flows through the tubes RO in the second row R2 and the third row R3 both upward and downward in the vertical direction HR. This results in four more flow paths through the tubes RO in the second row and third row R3.

Figure 3A:
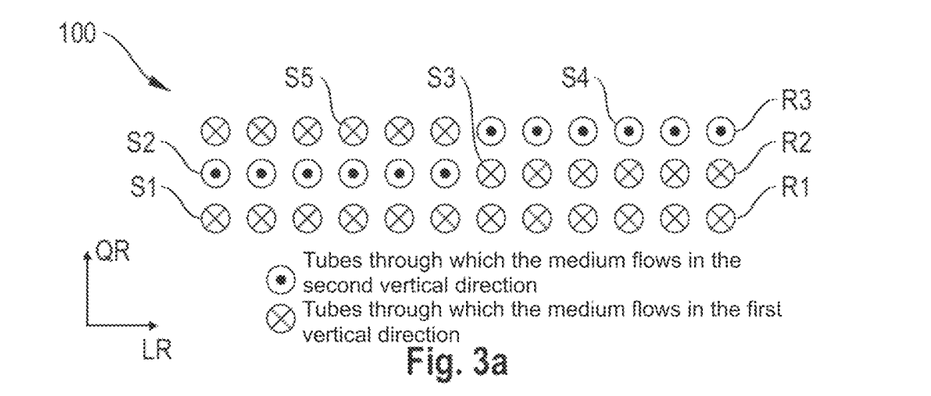
FIG. 3a shows a schematic illustration of how five flow paths for the first medium are configured in a first embodiment according to the invention.

FIG. 3 shows schematic illustrations of flow paths for the first medium (not shown) through the heat exchanger 100 in the first embodiment according to the invention. FIG. 3a shows a schematic illustration of five flow paths S1, S2, S3, S4, S5 for the first medium (not shown) through the heat exchanger 100 in a first embodiment. The first medium flows in a first vertical direction through tubes RO marked with an X. The medium flows in the same vertical direction in all of the flow paths indicated by odd numbers S1, S3 S5. The medium flows in the opposite vertical direction in the flow paths with even numbers S2, S4. The medium flows through tubes with a dot in the middle in the opposite vertical direction. The heat exchanger has a length LR and a width QR. The width QR is defined by the shortest side of the heat exchanger 100. The tubes RO are in three rows R1, R2, R3 along the length LR. The three rows R1, R2, R3 are adjacent to one another across the width QR. The tubes RO in the first row R1 form the first flow path S1, through which the medium flows vertically in the first direction. The tubes RO are divided into two flow paths S2 and S3. The tubes RO in the second flow path S2 and third flow path S3 are connected such that the second row R2 is divided into two connected sections. The tubes RO in the third row R3 are divided into the fourth flow path S4 and fifth flow path S5. The tubes RO in the fourth flow path S4 and third fifth flow path S5 are connected such that the third row R3 is divided into two connected sections. The fourth flow path S4 and fifth flow path S5 in the third row R3 are configured such that the medium flows through them in the opposite direction that it flows through the flow paths S2, S3 in the adjacent row R2. This results in a heat exchanger 100 with an extremely uniform temperature profile.

Figure 3B:
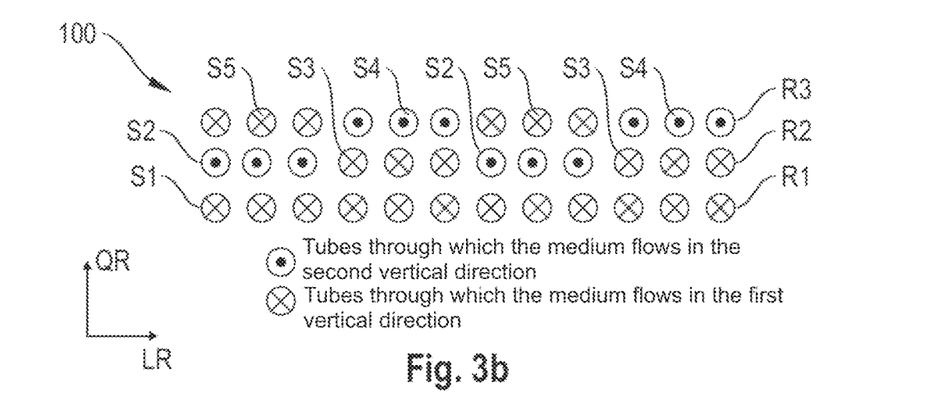
FIG. 3b shows a schematic illustration of how five flow paths for the first medium are configured in a second embodiment according to the invention.

The schematic illustration in FIG. 3b shows a second embodiment of configuration of five flow paths S1, S2, S3, S4, S5 for the first medium (not shown) through the heat exchanger 100. The tubes RO in the first row R1 form the first flow path S1, through which the medium flows in a first vertical direction. The tubes in the second row are divided into the second flow path S2 and the third flow path S3. The medium flows in the opposite direction in the second flow path S2, and in the first direction in the third flow path S3. The second flow path S2 and third flow path S3 are each divided into two sections, resulting in a total of four sections in the second row R2. These sections of the flow paths S2, S3 alternate. The tubes RO in the third row RO R3 are divided into the fourth flow path S4 and the fifth flow path S5. The medium flows in the second direction through the fourth flow path S4 and in the first direction in the fifth flow path S5. Both the fourth flow path S4 and fifth flow path S5 are divided into two sections such that the third row is divided into four sections. The fourth flow path S4 and fifth flow path S5 are placed such that the medium flows through them in the opposite direction that it flows through the flow paths S2, S3 in the adjacent row. This results in an extremely uniform temperature profile for the heat exchanger 100.

Figure 3C:
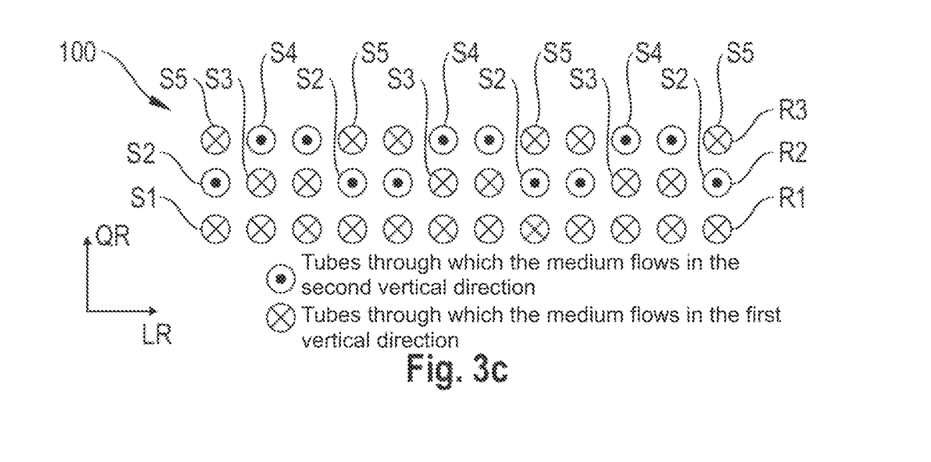
FIG. 3c shows a schematic illustration of how five flow paths for the first medium are configured in a third embodiment according to the invention.

FIG. 3c shows a schematic illustration of a third embodiment of the configuration of five flow paths S1, S2, S3, S4, S5 for the first medium (not shown) through the heat exchanger 100. The tubes RO in the first row R1 form the first flow path S1, through which the medium flows in a first vertical direction. The tubes RO in the second row R2 are divided into the second flow path S2 and third flow path S3. The medium flows through the second flow path S2 in the opposite direction, and through third flow path S3 in the first direction. The second flow path S2 is divided into four sections and the third flow path S3 is divided into three sections such that the second row R2 is divided into seven sections. The first section along the length LR belongs to the second flow path S2. The sections of the flow paths S2, S3 alternate. The tubes RO in the third row R3 are divided into the fourth flow path S4 and the fifth flow path S5. The medium flows in the second direction in the fourth flow path S4 and the first direction in the fifth flow path S5. The fourth flow path S4 is divided into three sections and the fifth flow path S5 is divided into four sections such that the third row is divided into seven sections. The individual sections of the flow paths S4, S5 alternate. The fourth flow path S4 and fifth flow path S5 are placed such that the first medium flows through them in the opposite direction to that in the flow paths S2, S3 in the adjacent row. This results in an extremely uniform temperature profile for the heat exchanger 100.

Figure 4:
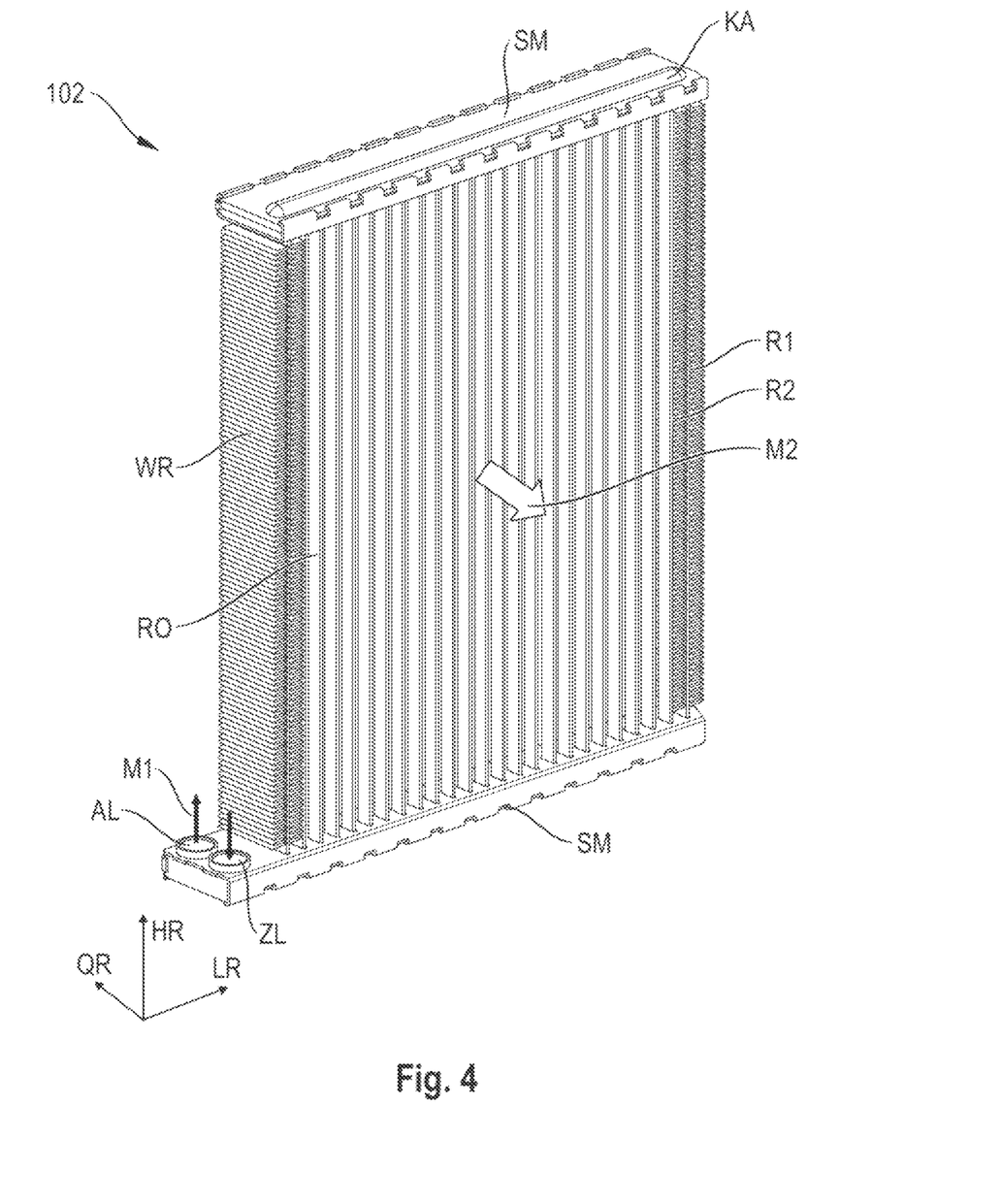
FIG. 4 shows another embodiment of the heat exchanger according to the invention.

The heat exchanger 100 is shown in the assembled state in another embodiment according to the invention in FIG. 4. This heat exchanger 100 has two rows R1, R2 across its width QR of tubes RO along its length LR. The first medium M1 flows through the tubes RO. The second medium M2 flows around the tubes RO. Corrugated ribs WR are placed between the tubes RO. This increases the surface area available for heat exchange between the first medium M1 and second medium M2. The first medium M1 can be a coolant and the second medium can be air. The width QR is defined by the short side of the heat exchanger, and the length LR is defined by the long side thereof. The medium M1 flows downward in the vertical direction HR of the heat exchanger 100 through the tubes RO. The heat exchanger 100 has a feed line ZL through which the first medium M1 is supplied to the heat exchanger 100. The first medium M1 is then removed through the outlet line AL. The heat exchanger 100 has two collectors SM for distributing and collecting the first medium M1. The two collectors SM are on opposite ends of the tubes RO. The collector SM at the lower end of the tubes RO is the lower collector SM. The collector SM at the upper end of the tubes RO is the upper collector SM. The vertical direction HR is from the lower collector SM to the upper collector SM. The feed line ZL and outlet line AL are both connected to the lower collector SM. The two collectors can each have one channel KA in which the first medium M1 is collected or distributed. The two collectors could also have chambers for collecting and distributing the first medium M1. The feed line ZL and outlet line AL are connected to the lower collector SM. The vertical direction HR is from the lower collector to the upper collector SM. All of the parts of the heat exchanger 100 can be made of metal and connected to one another in a material bonded manner. It is also conceivable for all of the parts except the collectors SM to be made of metal, which are connected to one another in a material bonded manner. In this case, the collectors SM are made of plastic and connected to the other parts in a force-fitting or form-fitting manner.

Figure 5A:
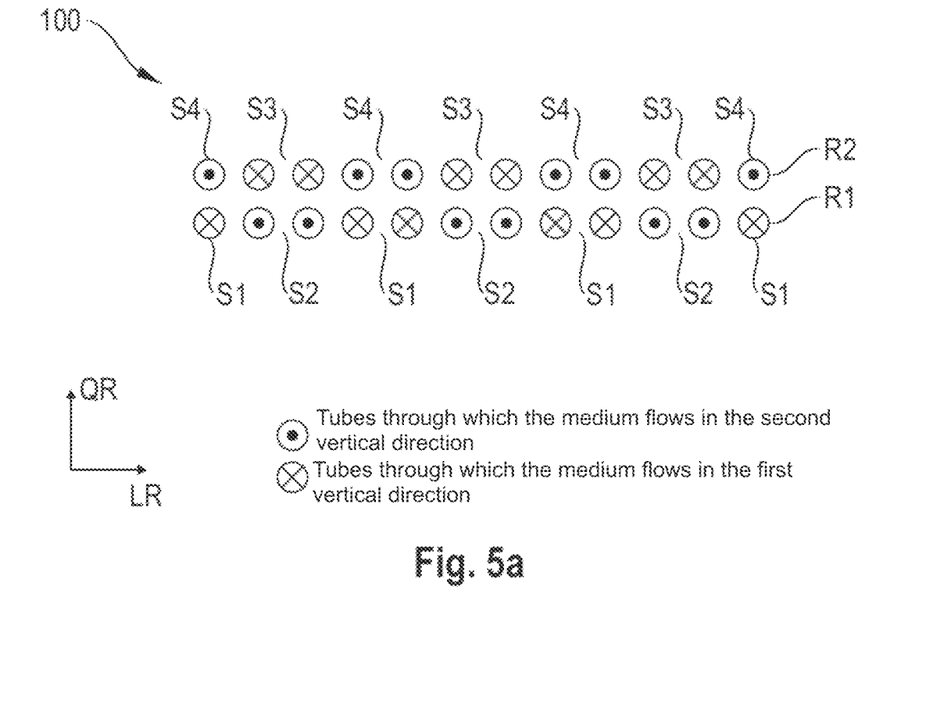
FIG. 5a shows a schematic illustration of how four flow paths for the first medium are configured in another embodiment according to the invention.
Figure 5B:
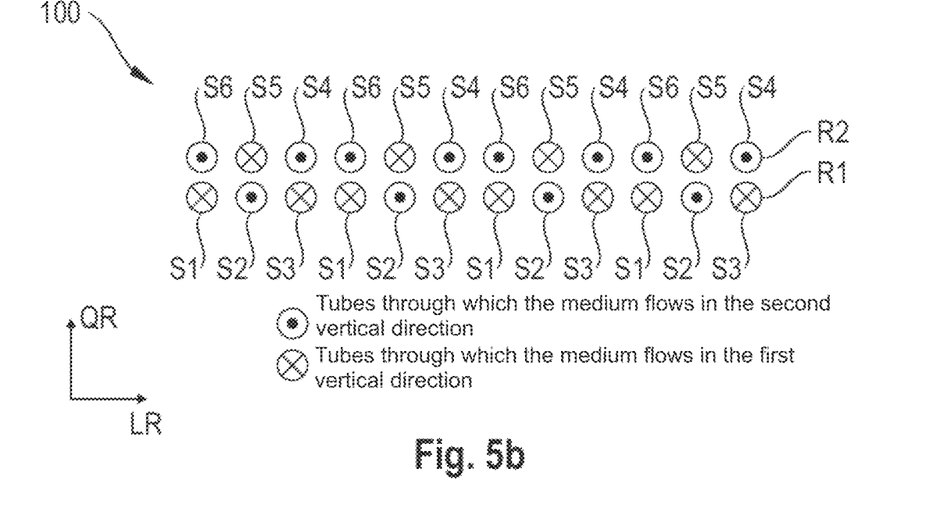
FIG. 5b shows a schematic illustration of how six flow paths for the first medium are configured in another embodiment according to the invention.

FIG. 5 shows schematic illustrations of flow paths for the first medium (not shown) through the heat exchanger 100 in another embodiment according to the invention.

Four flow paths S1, S2, S3, S4 are shown in another embodiment in FIG. 5a. The heat exchanger 100 has two rows R1, R2 across its width QR of tubes RO along its length. The first medium flows upward through the tubes RO marked with an X. The first medium flows in the opposite vertical direction in the tubes RO marked with a dot. The first medium flows upward through the outermost tubes RO in the first row R1. The other tubes RO in the first row are connected in alternating pairs, such that the first medium flows downward through one next pair, and upward through the subsequent pair. The tubes RO through which the first medium flows upward form the first flow path S1. The tubes through which the first medium flows downward form the second flow path S2. The first medium flows downward through the outermost tubes RO in the second row R2. The other tubes RO in the second row are connected in alternating pairs, such that first medium flows upward through one pair and downward through the next pair. The tubes RO through which the first medium flows upward form the third flow path S3. The tubes RO through which the first medium flows downward form the fourth flow path S4. In this manner, the first medium flows in a meandering path through the tubes RO in the heat exchanger 100. This can also be described as a loop. This results in an extremely uniform temperature profile.

Six flow paths are shown in another embodiment in FIG. 5b. The heat exchanger 100 has two rows R1, R2 across its width QR of tubes RO along its length LR. The first medium (not shown) flows upward through the tubes RO marked with an X. The first medium flows downward through those tubes RO marked with a dot. The tubes RO are connected in groups of three in the first row R1. The first medium flows downward in the middle tube RO in each group of three, while the first medium flows upward in the other two tubes. This results in three flow paths S1, S2, S3 in each group of three along the length LR. The tubes are also connected in groups of three in the second row. The first medium flows upward in the middle tube RO in each group of three, and downward in the two other tubes. This results in three flow paths S4, S5, S6 in each group of three along the length LR. This results in an extremely uniform temperature profile.

Figure 6:
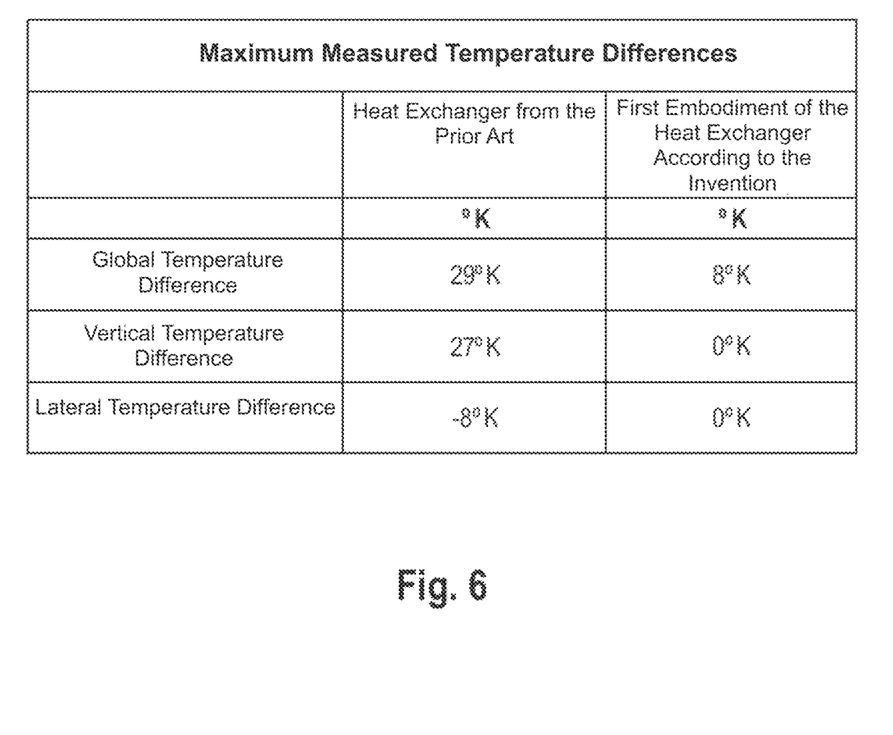
FIG. 6 shows a comparison of the maximum measured temperature changes in a heat exchanger from the prior art and a heat exchanger in another embodiment according to the invention.

FIG. 6 shows the maximum measured temperature differences in a heat exchanger from the prior art and a first embodiment of the heat exchanger according to the invention. The maximum measured temperature differences in a heat exchanger from the prior art are on the left. The maximum measured temperature differences in a first embodiment of a heat exchanger according to the invention are listed on the right. The improvement can be clearly seen.

The application can be best understood with reference to the following Numbered Paragraphs:

Numbered Paragraph 1. A heat exchanger (100) for a motor vehicle, exhibiting:
height (HR)
width (QR)
length (LR)
tubes (RO) through which a first medium (M1) flows,
characterized in that the heat exchanger (100) has at least three rows (R1, R2, R3) across its width (QR) of tubes (RO) along its length (LR), wherein each of the tubes (RO) are combined in the at least three rows (R1, R2, R3) to form at least one flow path (S1, S2, S3, S4, S5) for the first medium (M1), wherein the first row (R1) has at least one first flow path (S1) through which the first medium (M1) flows in the vertical direction (HR), wherein the first flow path (S1) preferably comprises at least one third of the length (LR) of the heat exchanger (100).

Numbered Paragraph 2. The heat exchanger (100) according to Numbered Paragraph 1, characterized in that the first flow path (S1) comprises the entire length (LR) of the heat exchanger (100).

Numbered Paragraph 3. The heat exchanger (100) according to Numbered Paragraph 1 or 2, characterized in that the at least two other rows (R2, R3), which are adjacent to the first row (R1) across its width (QR), each contain at least two flow paths (S2, S3, S4, S5) along their lengths (LR), wherein the first medium (M1) flows either upward or downward in the vertical direction (HR) in the at least two flow paths (S2, S3, S4, S5), wherein the first medium (M1) flows through the at least two flow paths (S4, S5) in the third row (R3), which is adjacent to the second row (R2) across the width (QR), in the direction opposite to the direction in which the first medium (M1) flows through the flow paths (S2, S3) laterally adjacent thereto across the width (QR).

Numbered Paragraph 4. The heat exchanger (100) according to any of the preceding Numbered Paragraphs, characterized in that the heat exchanger (100) has five flow paths (S1, S2, S3, S4, S5) in three rows (R1, R2, R3), wherein the second row (R2) has two flow paths (S2, S3), wherein the first medium (M1) flows in the opposite vertical direction (HR) in second flow path (S2) in the second row (R2), while the first medium (M1) flows in the first vertical direction (HR) in the third flow path (S3).

Numbered Paragraph 5. The heat exchanger (100) according to any of the preceding Numbered Paragraphs, characterized in that the second flow path (S2) is between one third and two thirds the length (LR) of the heat exchanger (100), wherein the fourth flow path (S4) is between one third and two thirds the length (LR) of the heat exchanger (100).

Numbered Paragraph 6. The heat exchanger (100) according to any of the preceding Numbered Paragraphs, characterized in that the two flow paths (S2, S3) in the second row (R2) are each one half the length (LR) of the heat exchanger (100), wherein the two flow paths (S4, S5) in the third row (R3) are each one half the length (LR) of the heat exchanger (100).

Numbered Paragraph 7. The heat exchanger (100) according to any of the preceding Numbered Paragraphs, characterized in that the five flow paths (S1, S2, S3, S4, S5) are each connected to one another in the three rows (R1, R2, R3).

Numbered Paragraph 8. The heat exchanger (100) according to any of the preceding Numbered Paragraphs 1-6, characterized in that the four flow paths (S2, S3, S4, S5) in the second row (R2) and third row (R3) are each divided into at least two sections, wherein the sections of the flow paths (S2, S3, S4, S5) alternate across the width (QR).

Numbered Paragraph 9. The heat exchanger (100) according to any of the preceding Numbered Paragraphs, characterized in that the tubes (RO) are flat tubes, wherein the tubes (RO) are substantially parallel to one another, wherein corrugated ribs (WR) are placed between the tubes (RO).

Numbered Paragraph 10. The heat exchanger (100) according to any of the preceding Numbered Paragraphs, characterized in that the heat exchanger has two collectors (S1, S2) that connect the tubes (RO) for conducting fluid, wherein the first medium (M1) is collected or distributed in at least one channel (KA) in each of the two collectors (SM).

Numbered Paragraph 11. The heat exchanger (100) according to any of the preceding Numbered Paragraphs, characterized in that the heat exchanger (100) has at least two first distributer plates (VP1) for distributing the first medium (M1) to the flow paths (S1, S2, S3, S4, S5), wherein the heat exchanger has at least two second distributer plates (VP2) for distributing the first medium (M1) to the tubes (RO).

Numbered Paragraph 12. The heat exchanger (100) according to any of the preceding Numbered Paragraphs, characterized in that the first medium (M1) is deflected across the width (QR) in the two collectors (S1, S2) and the at least two first distributor plates (VP1).

Numbered Paragraph 13. The heat exchanger (100) according to any of the preceding Numbered Paragraphs, characterized in that the tubes (RO), corrugated ribs (WR), at least two first distributor plates (VP1), at least two second distributor plates (VP2), and two collectors (S1, S2) are made of metal, wherein the tubes (RO), corrugated ribs (WR), at least two first distributor plates (VP1), at least two second distributor plates (VP2), and two collectors (S1, S2) are connected to one another in a material-bonded manner.

Numbered Paragraph 14. An air conditioning system for a motor vehicle, comprising:
a housing
a heat pump
at least one channel for conducting a second medium (M2)
at least one blower
a heat exchanger (100) that is part of the cooling circuit, according to at least one of the Numbered Paragraphs 1-12 for heating the second medium (M2) conducted into the vehicle interior
wherein the heat exchanger (100, 101) is a condenser.

Numbered Paragraph 15. The air conditioning system according to Numbered Paragraph 13, characterized in that the air conditioning system also has an electric resistance heater for heating the second medium (M2).

LIST OF REFERENCE SYMBOLS

LR length
QR width
HR height
M1 first medium
M2 second medium
AL outlet line for the first medium
ZL feed line for the first medium
RO tube
WR corrugated rib
S1, S2, S3 flow paths for the first medium
S4, S5, S6
R1, R2, R3 rows in which the tubes are placed
SM collector
HP retaining plate for the tubes
VP1 first distributor plate for distributing the first medium
VP2 second distributor plate for distributing the first medium to the tubes
KA channel in collector for collecting and distributing the first medium
100 first embodiment of the heat exchanger
101 second embodiment of the heat exchanger

The invention claimed is:

1. A heat exchanger for a motor vehicle, wherein the heat exchanger comprises:
a height;
a width;
a length; and
a plurality of tubes through which a first medium flows, wherein the heat exchanger has at least three rows across the width of the heat exchanger along the length, wherein each of the tubes are combined in the at least three rows to form at least one flow path for the first medium, wherein the first row has at least one first flow path through which the first medium flows in the vertical direction, wherein the first flow path comprises at least one third of the length of the heat exchanger.

2. The heat exchanger according to claim 1, wherein the first flow path comprises the entire length of the heat exchanger.

3. The heat exchanger according to claim 1, wherein the at least two other rows, which are adjacent to the first row across its width, each contain at least two flow paths along their lengths, wherein the first medium flows either upward or downward in the vertical direction in the at least two flow paths, wherein the first medium flows through the at least two flow paths in the third row, which is adjacent to the second row across the width, in the direction opposite to the direction in which the first medium flows through the flow paths laterally adjacent thereto across the width.

4. The heat exchanger according to claim 1, wherein the heat exchanger comprises has five flow paths in three rows, wherein the second row has two flow paths, wherein the first medium flows in the opposite vertical direction in second flow path in the second row, while the first medium flows in the first vertical direction in the third flow path.

5. The heat exchanger according to claim 1, wherein the second flow path is between one third and two thirds the length of the heat exchanger, wherein the fourth flow path is between one third and two thirds the length of the heat exchanger.

6. The heat exchanger according to claim 1, wherein the two flow paths in the second row are each one half the length of the heat exchanger, wherein the two flow paths in the third row are each one half the length of the heat exchanger.

7. The heat exchanger according to claim 1, wherein the five flow paths are each connected to one another in the three rows.

8. The heat exchanger according to claim 1, wherein the four flow paths in the second row and third row are each divided into at least two sections, wherein the sections of the flow paths alternate across the width.

9. The heat exchanger according to claim 1, wherein the tubes are flat tubes, wherein the tubes are substantially parallel to one another, wherein corrugated ribs are placed between the tubes.

10. The heat exchanger according to claim 1, wherein the heat exchanger comprises two collectors that connect the tubes for conducting fluid, wherein the first medium is collected or distributed in at least one channel in each of the two collectors (SM).

11. The heat exchanger according to claim 1, wherein the heat exchanger comprises has at least two first distributer plates (VP1) for distributing the first medium to the flow paths, wherein the heat exchanger further comprises has at least two second distributer plates for distributing the first medium to the tubes.

12. The heat exchanger according to claim 1, wherein the first medium is deflected across the width in the two collectors and the at least two first distributor plates.

13. The heat exchanger according to claim 1, wherein the tubes, corrugated ribs, at least two first distributor plates, at least two second distributor plates, and two collectors are made of metal, wherein the tubes, corrugated ribs, at least two first distributor plates, at least two second distributor plates, and two collectors are connected to one another in a material-bonded manner.

14. An air conditioning system for the motor vehicle, comprising:
   a housing;
   a heat pump;
   at least one channel for conducting a second medium;
   at least one blower;
   the heat exchanger, according to claim 1 for heating the second medium conducted into a vehicle interior
   wherein the heat exchanger is a condenser.

15. The air conditioning system according to claim 14, wherein the air conditioning system further comprises an electric resistance heater for heating the second medium.

* * * * *